(12) United States Patent
Kodama et al.

(10) Patent No.: US 12,271,716 B2
(45) Date of Patent: Apr. 8, 2025

(54) COMPUTER-READABLE RECORDING MEDIUM STORING CONVERSION PROGRAM AND CONVERSION PROCESSING METHOD

(71) Applicant: Fujitsu Limited, Kawasaki (JP)

(72) Inventors: Hiroyoshi Kodama, Isehara (JP); Takahide Yoshikawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 82 days.

(21) Appl. No.: 18/159,693

(22) Filed: Jan. 26, 2023

(65) Prior Publication Data

US 2023/0409302 A1 Dec. 21, 2023

(30) Foreign Application Priority Data

Jun. 9, 2022 (JP) ................. 2022-093497

(51) Int. Cl.
*G06F 8/41* (2018.01)
*G06F 30/327* (2020.01)
*G06F 30/343* (2020.01)

(52) U.S. Cl.
CPC .................. *G06F 8/443* (2013.01)

(58) Field of Classification Search
CPC ....... G06F 8/443; G06F 30/327; G06F 30/343
See application file for complete search history.

(56) References Cited

U.S. PATENT DOCUMENTS

| | | | |
|---|---|---|---|
| 8,739,102 B1 | 5/2014 | Perry | |
| 10,812,630 B2* | 10/2020 | Beckman | G06F 16/9532 |
| 10,977,018 B1* | 4/2021 | Hwang | G06F 8/47 |
| 2014/0189312 A1* | 7/2014 | Tan | G06F 8/65 |
| | | | 712/214 |
| 2019/0206110 A1* | 7/2019 | Gierach | G06F 8/443 |
| 2020/0167139 A1* | 5/2020 | Drepper | G06F 8/451 |
| 2020/0225922 A1 | 7/2020 | Denisenko | |
| 2021/0116882 A1 | 4/2021 | Yoshida et al. | |
| 2022/0366111 A1 | 11/2022 | Nagashima et al. | |

FOREIGN PATENT DOCUMENTS

| | | | |
|---|---|---|---|
| JP | 2012053507 A | * | 3/2012 |
| JP | 2019-215697 A | | 12/2019 |
| JP | 2021-002185 A | | 1/2021 |

* cited by examiner

*Primary Examiner* — Daxin Wu
(74) *Attorney, Agent, or Firm* — Fujitsu Intellectual Property Center

(57) ABSTRACT

A non-transitory computer-readable recording medium stores a conversion program for causing a computer to execute a process including: dividing a source program into a plurality of program blocks; selecting, based on a result of analysis of an access count from each of the plurality of program blocks to each of a plurality of accelerators, a first program block among the plurality of program blocks and an accelerator of an arrangement destination of the first program block, among the plurality of accelerators; and converting the first program block into a hardware logic to be operated in the accelerator of the arrangement destination.

9 Claims, 12 Drawing Sheets

FIG. 6

STORAGE UNIT 110

EXAMPLE OF SOURCE CODE 111

```
1  struct gmx_many_fft
2  {
3      int   howmany;
4      int   dist;
5      gmx_fft_t fft;
6  };
7
8  typedef struct gmx_many_fft* gmax_many_fft_t;
9
10 int gmx_fft_init_many_1d(gmx_fft_t* pfft, int nx, int howmany, gmx_fft_flag flags)
11 {
12     gmx_many_fft_t fft;
13     if (pfft == nullptr)
14     {
15         ...
16     }
17     ...
18 }
19 ...
```

$$c_{ij} = \sum_{k=1}^{n} a_{ik} \times b_{kj}$$

```
for (i = 0; i < n; i++) {        // FOCUS ON i-TH ROW OF c
    for (j = 0; j < n; j++) {    // FOCUS ON j-TH COLUMN OF c
        for (k = 0; k < n; k++) { // LOOP OF SUM CALCULATION
            c[i][j] += a[i][k]*b[k][j];
}}}
```
111c

FIG. 9

STORAGE UNIT — 110

INTERACTION COUNT TABLE — 112

| PROGRAM BLOCK ID | STORAGE INTERACTION COUNT | NW INTERACTION COUNT | MEMORY INTERACTION COUNT | FPGA INTERACTION COUNT | GPU INTERACTION COUNT |
|---|---|---|---|---|---|
| A | 4 | 0 | 0 | 0 | 0 |
| B | 1 | 3 | 0 | 0 | 0 |
| C | 0 | 3 | 3 | 1 | 0 |
| ... | ... | ... | ... | ... | ... |

COMPUTER-READABLE RECORDING MEDIUM STORING CONVERSION PROGRAM AND CONVERSION PROCESSING METHOD

CROSS-REFERENCE TO RELATED APPLICATION

This application is based upon and claims the benefit of priority of the prior Japanese Patent Application No. 2022-93497, filed on Jun. 9, 2022, the entire contents of which are incorporated herein by reference.

FIELD

The embodiments discussed herein are related to a non-transitory computer-readable recording medium storing a conversion program and a conversion processing method.

BACKGROUND

A computer system having a heterogeneous environment in which different types of arithmetic elements are mixed is used. In the heterogeneous environment, for example, improvement of calculation performance may be attempted by offload of a process of a central processing unit (CPU) to an accelerator. For example, a field-programmable gate array (FPGA), a graphics processing unit (GPU), or the like is used for the accelerator.

Japanese Laid-open Patent Publication No. 2021-2185, Japanese Laid-open Patent Publication No. 2019-215697, U.S. Patent No. 2020/0225922, U.S. Pat. No. 8739102, and U.S. Patent No. 2021/0116882 are disclosed as related art.

SUMMARY

According to an aspect of the embodiments, a non-transitory computer-readable recording medium stores a conversion program for causing a computer to execute a process including: dividing a source program into a plurality of program blocks; selecting, based on a result of analysis of an access count from each of the plurality of program blocks to each of a plurality of accelerators, a first program block among the plurality of program blocks and an accelerator of an arrangement destination of the first program block, among the plurality of accelerators; and converting the first program block into a hardware logic to be operated in the accelerator of the arrangement destination.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a diagram illustrating an example of a source code;

FIG. 9 is a diagram illustrating an example of an interaction count table;

DESCRIPTION OF EMBODIMENTS

A technology of converting a source program described in a high-level language such as C or C++ into a logic of an accelerator is referred to as high-level synthesis. For example, there is proposed a high-level synthesis apparatus that automatically generates an optimum hardware description language for hardware in which an external memory is added to an integrated circuit. A parameter optimization apparatus that determines an optimum combination of the number of loop expansions and the number of parallel circuits in high-level synthesis is proposed.

A plurality of accelerators may be coupled to a node including a CPU, and the plurality of accelerators are usable as offload destinations for the process of the CPU. For example, each accelerator may be mounted in various devices such as an external storage device, a memory device, and a network device coupled to the node. In this case, a mechanism that appropriately determines which part of a source program is to be arranged in which accelerator becomes a problem.

According to one aspect, an object of the present disclosure is to allocate a process to an appropriate accelerator.

Hereinafter, the present embodiments will be described with reference to the drawings.

[First Embodiment]

A first embodiment will be described.

Figure 1:
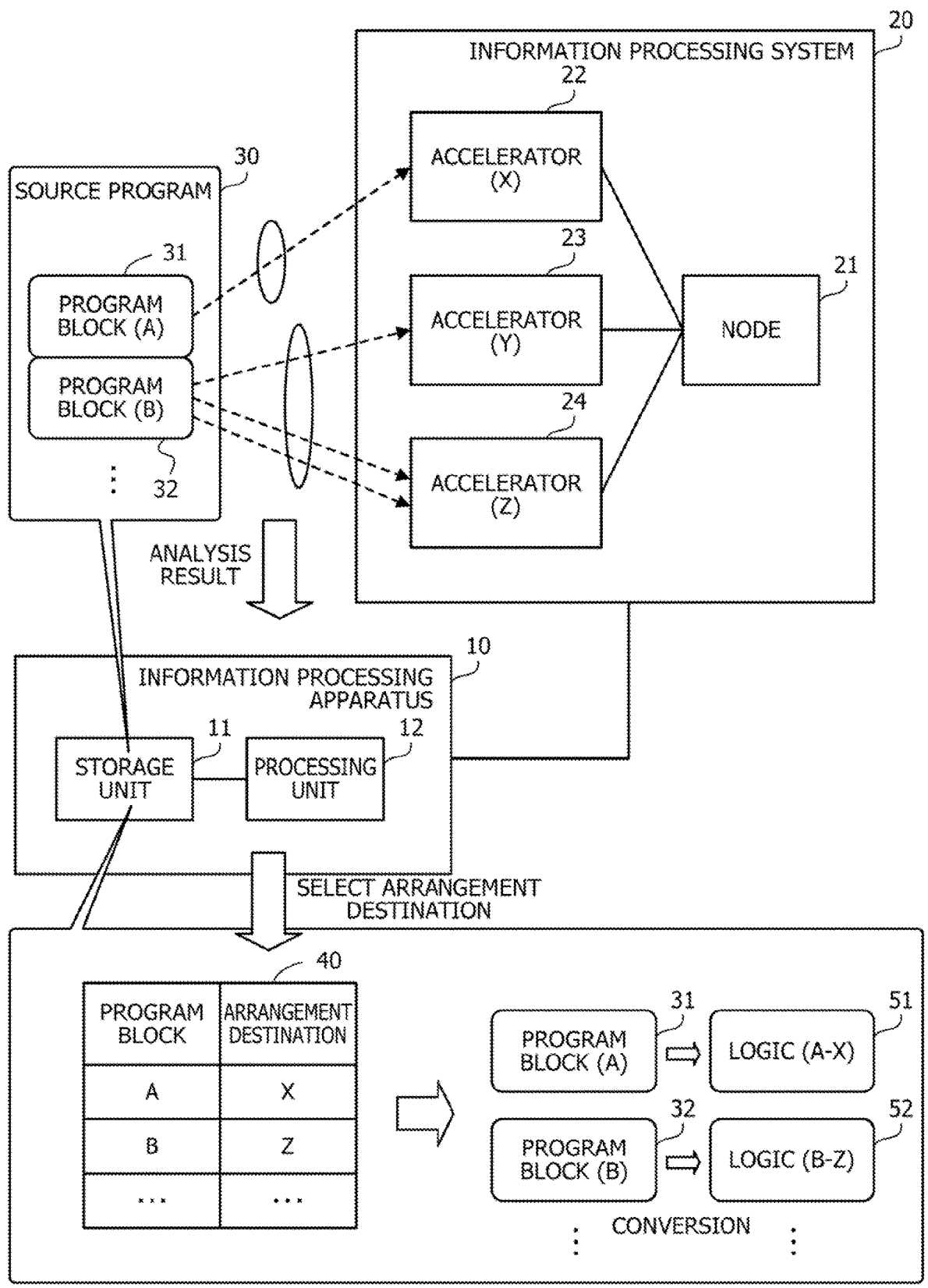
FIG. 1 is a diagram describing an information processing apparatus according to a first embodiment.

FIG. 1 is a diagram describing an information processing apparatus according to the first embodiment.

An information processing apparatus 10 is coupled to an information processing system 20 via a network. The information processing system 20 includes a node 21 and accelerators 22, 23, and 24. The node 21 is coupled to the accelerators 22, 23, and 24. The node 21 includes a CPU or a RAM. For example, the accelerators 22, 23, and 24 are implemented by an FPGA, a GPU, a tensor processing unit (TPU), a data processing unit (DPU), and the like. The information processing system 20 may include an individual RAM coupled to each of the accelerators 22, 23, and 24. The information processing apparatus 10 may be included in the information processing system 20.

The accelerators 22, 23, and 24 may be mounted in devices having types different from each other. The devices in which the accelerators 22, 23, and 24 are mounted are, for example, a shared storage, a shared memory, a network (NW) device, an FPGA device, a GPU device, and the like. The shared storage provides an external storage shared by a plurality of nodes including the node 21 in the information processing system 20. The shared memory provides an external memory shared by the plurality of nodes. The NW device relays communication between the nodes. The FPGA device provides an external FPGA to the node 21. The GPU device provides an external GPU to the node 21.

The accelerators 22, 23, and 24 execute a predetermined function of a device such as the shared storage or the NW device, and is also usable as an offload destination of the processing of the CPU included in the node 21. As an example of such an accelerator, a smart network interface card (smart NIC) implemented by the FPGA or the like in the NW device is used.

For example, the accelerator 22 may be mounted in the shared storage. The accelerator 23 may be mounted in the shared memory. The accelerator 24 may be mounted in the NW device. The accelerators 22, 23, and 24 may be mounted in the FPGA device or the GPU device.

For example, the node 21 and the accelerators 22, 23, and 24 may be coupled to each other via an interconnect such as Compute Express Link (CXL, registered trademark) or a network such as Ethernet (registered trademark) and Infiniband. In the following description, an identifier of the accelerator 22 is X. An identifier of the accelerator 23 is Y. An identifier of the accelerator 24 is Z.

The information processing apparatus 10 compiles a source program 30 described in a high-level language such as C language or C++, and generates an executable file to be executed by the information processing system 20. In the information processing system 20, an arithmetic operation is executed by at least a part of the CPU included in the node 21 and the accelerators 22, 23, and 24. An environment in which a plurality of types of arithmetic elements are mixed in the same manner as in the information processing system 20 is referred to as a heterogeneous environment.

The information processing apparatus 10 includes a storage unit 11 and a processing unit 12. The storage unit 11 may be a volatile storage device such as a random-access memory (RAM), or may be a non-volatile storage device such as a hard disk drive (HDD) or a flash memory. The storage unit 11 stores the source program 30 or data to be used for a process by the processing unit 12.

The processing unit 12 may include a CPU, a digital signal processor (DSP), an application-specific integrated circuit (ASIC), an FPGA, and the like. The processing unit 12 may be a processor that executes a program. The "processor" may include a set (multiprocessor) of a plurality of processors.

At a time of compiling, the processing unit 12 converts a description of at least a part of the source program 30 into a hardware logic to be operated in any accelerator, and enables an offload of a process according to the description from the node 21 to the corresponding accelerator. A high-level synthesis technology is used to convert the description of the source program 30 into the hardware logic to be operated in the accelerator. The high-level synthesis may be performed based on a coarse-grained reconfigurable architecture (CGRA). A tool for performing the high-level synthesis, for example, a high-level synthesis tool is a Vivado (registered trademark) HLS compiler, an Intel (registered trademark) HLS compiler, or the like. The HLS is an abbreviation for the high-level synthesis.

First, the processing unit 12 divides the source program 30 into a plurality of program blocks. The program block is a set of functions. For example, the processing unit 12 divides the source program 30 into a predetermined number of program blocks such that the number of functions included in each program block is approximately the same. The processing unit 12 may divide the source program 30 into the predetermined number of program blocks such that the number of code lines included in each program block is approximately the same. For example, the plurality of program blocks include program blocks 31, 32, . . . . An identifier of the program block 31 is A. An identifier of the program block 32 is B.

The processing unit 12 analyzes an access count to each of a plurality of accelerators by each of the plurality of program blocks. For example, the access count from each program block to the accelerator corresponds to the number of calls (call count) of the corresponding accelerator by the program block.

The number of times the accelerator is called is obtained by counting the number of times a predetermined function corresponding to a type of device in which the accelerator is mounted, among functions included in the program block is called. With the C language as an example, the predetermined function according to the type of device includes the following. In the shared storage, for example, an ftputc function, an ftputs function, an ftprintf function, and the like are called. In the shared memory, for example, an mmap function and the like are called. In the NW device, for example, an ioctl function, a socket function, a connect function, and the like are called. In the GPU device, for example, cuda (registered trademark) and the like are called. In the FPGA device, for example, an fftw function, a gmx_fft library function of GROMACS, and the like are called.

For example, for the program block 31, the processing unit 12 obtains an access count "1" to the accelerator 22 and an access count "0" to the other accelerators. For the program block 32, the processing unit 12 obtains an access count "1" to the accelerator 23, an access count "2" to the accelerator 24, and an access count "0" to the other accelerators.

Based on a result of analysis of the access count, the processing unit 12 selects a first program block, among the plurality of program blocks. For example, the processing unit 12 selects, as the first program block, a program block in which the access count to at least one accelerator is one or more. The processing unit 12 selects an accelerator as an arrangement destination of the first program block, among the plurality of accelerators. For example, for each program block, the processing unit 12 sets an accelerator having the largest access count by the program block, as an accelerator of an arrangement destination of the program block.

For example, the program block 31 has the largest access count to the accelerator 22. Accordingly, the processing unit 12 sets the arrangement destination of the program block 31 to the accelerator 22. For example, the program block 32 has the largest access count to the accelerator 24. Accordingly, the processing unit 12 sets the arrangement destination of the program block 32 to the accelerator 24. An accelerator as the arrangement destination of the other program block is determined in the same manner. A program block that does not access any accelerator is allocated to the node 21 without being arranged to any accelerator. In a case where there are two or more accelerators having the largest access count for a certain program block, the processing unit 12 may preferentially select an accelerator mounted in a device for holding data such as the shared memory, among the two or more accelerators.

A table 40 indicates an accelerator as an arrangement destination of each program block. For example, the table 40 indicates that the arrangement destination of the program block 31 having the identifier A is the accelerator 22 corresponding to the identifier X. The table 40 indicates that the arrangement destination of the program block 32 having the identifier B is the accelerator 24 corresponding to the identifier Z. The program blocks 31 and 32 are examples of the first program block.

The processing unit 12 converts the first program block into a hardware logic to be operated in an accelerator of an arrangement destination. For the conversion into the hardware logic, the processing unit 12 may use an existing high-level synthesis tool corresponding to the corresponding accelerator. The hardware logic may be a logic specialized for specific hardware such as a GPU, for example.

For example, the processing unit 12 converts the program block 31 into a logic 51 to be operated in the accelerator 22, based on the table 40. An identifier "A-X" of the logic 51 indicates that the logic 51 is obtained by converting the program block 31 into a hardware logic to be operated in the accelerator 22. Based on the table 40, the processing unit 12 converts the program block 32 into a logic 52 to be operated in the accelerator 24. An identifier "B-Z" of the logic 52 indicates that the logic 52 is obtained by converting the program block 32 into a hardware logic to be operated in the accelerator 24.

For example, the processing unit 12 offloads a process corresponding to a part of the source program 30 from the node 21 to the accelerator. For example, the processing unit 12 compiles a main application executed by the node 21 based on the source program 30, and performs high-level synthesis of the program block to be offloaded to the accelerator. The processing unit 12 generates an executable file including an executable program of the main application cooperating with the accelerator and synthesized hardware logic information (for example, circuit information or the like of an FPGA).

The processing unit 12 causes the node 21 to execute the generated executable file. The node 21 performs a configuration of the corresponding accelerator based on the hardware logic information, and executes a process in cooperation with the accelerator by the main application.

With the information processing apparatus 10 as described above, a source program is divided into a plurality of program blocks. A result of analysis of an access count to each of the plurality of accelerators by each of the plurality of program blocks is acquired. Based on the result of the analysis of the access count, a first program block among the plurality of program blocks and an accelerator as an arrangement destination of the first program block among the plurality of accelerators are selected. The first program block is converted into a hardware logic to be operated in the accelerator of the arrangement destination.

Therefore, the information processing apparatus 10 may allocate a process to an appropriate accelerator. For example, the information processing apparatus 10 preferentially arranges each program block of the source program in an accelerator having a large access count among the program blocks. For this reason, data transfer between the CPU of the node 21 and the accelerator during an execution of a process related to a program block is reduced. As a result, an overhead related to the data transfer is reduced. Accordingly, the information processing apparatus 10 may improve processing performance in the information processing system 20.

By using results obtained by simulating operations of the logics 51, 52, . . . corresponding to the program blocks 31, 32, . . . , the processing unit 12 may obtain a performance index such as a calculation time or power consumption desirable to execute a process corresponding to the source program 30. Even in a case where the source program 30 is divided into different division units, the processing unit 12 generates a hardware logic by rearranging the program block to each accelerator in the same manner to obtain the performance index. The processing unit 12 may try the division in several division units in this manner, select a division unit having the most appropriate performance index, and compile the source program 30. Therefore, the information processing apparatus 10 may further improve the processing performance of the information processing system 20 that executes the process corresponding to the source program 30.

[Second Embodiment]

Next, a second embodiment will be described.

Figure 2:
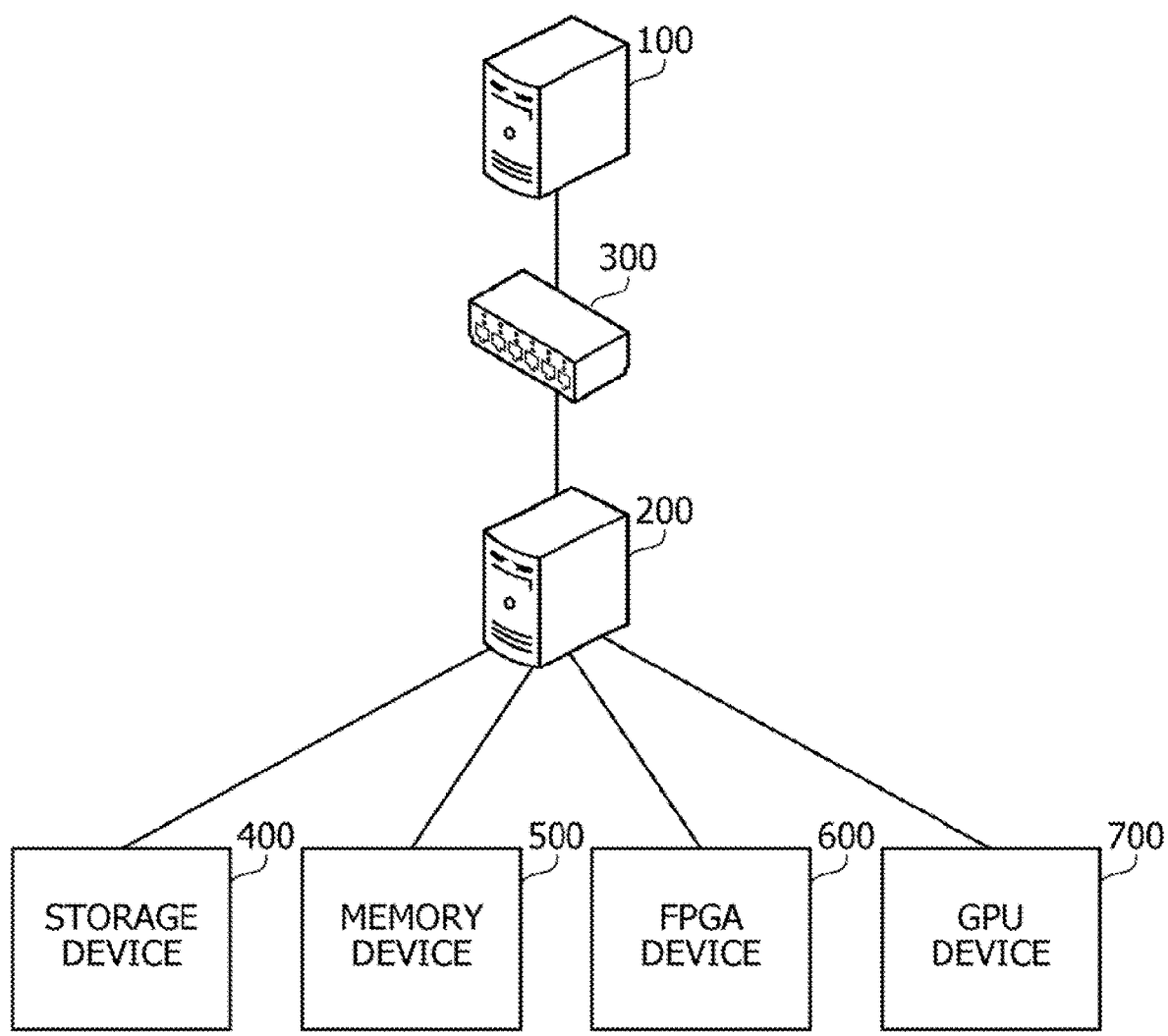
FIG. 2 is a diagram illustrating an example of an information processing system according to a second embodiment.

FIG. 2 illustrates an example of an information processing system according to the second embodiment.

The information processing system according to the second embodiment includes a management server 100, a node 200, an NW device 300, a storage device 400, a memory device 500, an FPGA device 600, and a GPU device 700. The management server 100 and the node 200 are coupled to the NW device 300. The storage device 400, the memory device 500, the FPGA device 600, and the GPU device 700 are coupled to the node 200. For example, CXL is used for an interface that couples the node 200 with the storage device 400, the memory device 500, the FPGA device 600, and the GPU device 700.

The management server 100 is a computer that compiles a source code of an application. The source code is described in a high-level language such as C language or C++. The source code may also be referred to as a source program. The management server 100 causes the node 200 to execute an executable file generated by the compiling. A plurality of accelerators are coupled to the node 200. The accelerator is implemented by, for example, an FPGA, a GPU, a TPU, a DPU, and the like. The accelerator may also be referred to as a hardware accelerator. In order to cause the node 200 to execute the application in cooperation with the plurality of accelerators, the management server 100 offloads a part of a process to the accelerator. In order to convert the description of the source code into a logic of the accelerator, the management server 100 uses a high-level synthesis technology. High-level synthesis may be performed based on CGRA.

The node 200 is a computer that executes the application in cooperation with the plurality of accelerators. The node 200 offloads the part of the process of the application to the accelerator mounted in each of the NW device 300, the storage device 400, the memory device 500, the FPGA device 600, and the GPU device 700.

The NW device 300 is a communication device that relays communication between the management server 100 and the node 200. The NW device 300 includes an NW accelerator implemented by, for example, an FPGA. The NW accelerator may be a so-called smart NIC. Although not illustrated in FIG. 2, a plurality of nodes including the node 200 or another NW device may be coupled to the NW device 300.

The storage device 400 is an external storage externally attached to the node 200. The storage device 400 includes a shared storage shared by the plurality of nodes including the node 200. The storage device 400 includes a storage accelerator implemented by, for example, an FPGA.

The memory device 500 is an external memory externally attached to the node 200. The memory device 500 includes a shared memory shared by the plurality of nodes including the node 200. The memory device 500 includes a memory accelerator implemented by, for example, an FPGA.

The FPGA device 600 is an arithmetic device externally attached to the node 200. The FPGA device 600 includes an FPGA as an accelerator usable by the node 200.

The GPU device 700 is an arithmetic device externally attached to the node 200. The GPU device 700 includes a GPU as an accelerator usable by the node 200.

As described above, the information processing system according to the second embodiment has a heterogeneous environment or a heterogeneous network.

Figure 3:
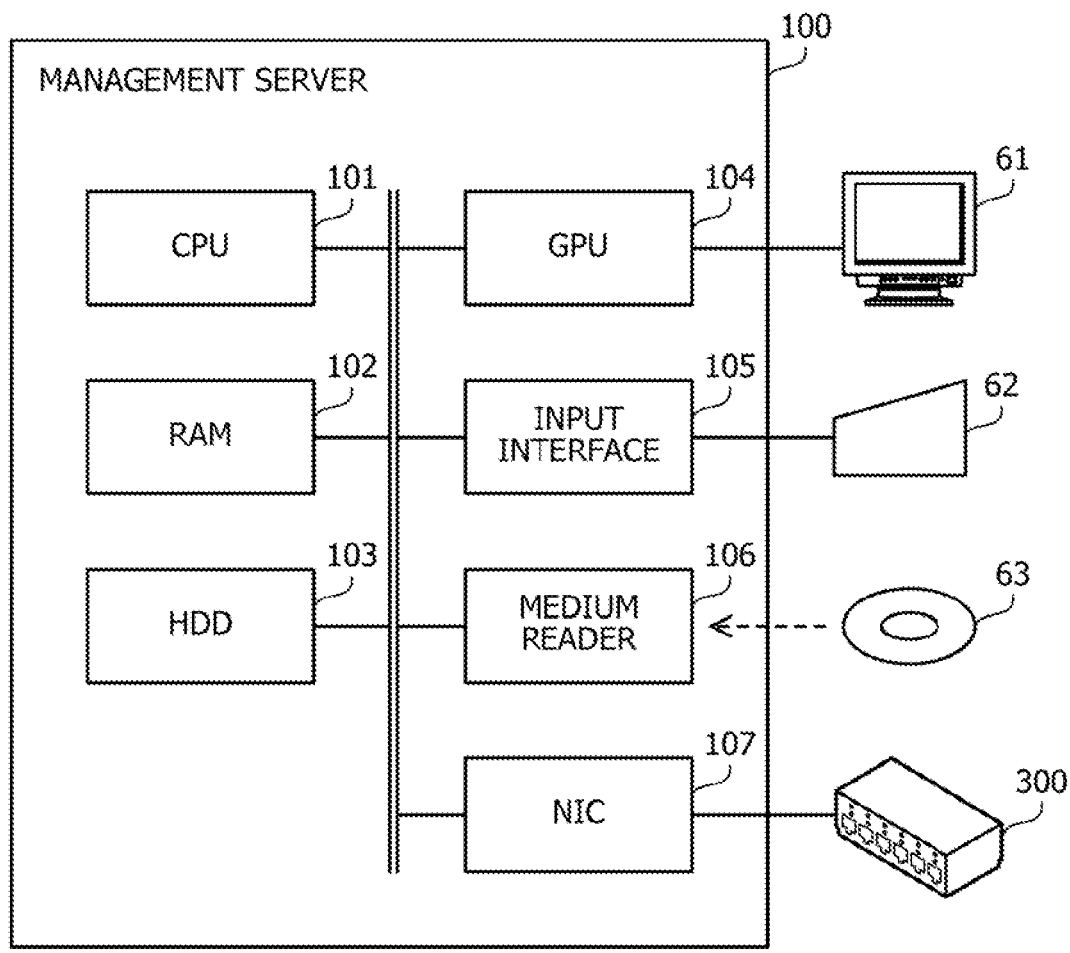
FIG. 3 is a diagram illustrating a hardware example of a management server.

FIG. 3 is a diagram illustrating a hardware example of a management server.

The management server 100 includes a CPU 101, a RAM 102, an HDD 103, a GPU 104, an input interface 105, a medium reader 106, and an NIC 107. The CPU 101 is an example of the processing unit 12 according to the first embodiment. The RAM 102 or the HDD 103 is an example of the storage unit 11 according to the first embodiment.

The CPU 101 is a processor that executes a command of a program. The CPU 101 loads at least a part of a program or data stored in the HDD 103 into the RAM 102, and executes the program. The CPU 101 may include a plurality of processor cores. The management server 100 may include a plurality of processors. A process to be described below may be executed in parallel by using the plurality of processors or processor cores. A set of the plurality of processors may be referred to as a "multiprocessor" or simply referred to as a "processor".

The RAM 102 is a volatile semiconductor memory that temporarily stores the program executed by the CPU 101 or data used for an arithmetic operation by the CPU 101. The management server 100 may include a type of memory other than the RAM, or may include a plurality of memories.

The HDD 103 is a non-volatile storage device that stores programs of software such as an operating system (OS), middleware, or application software, and data. The management server 100 may include a storage device of another type such as a flash memory or a solid-state drive (SSD), and may include a plurality of non-volatile storage devices.

According to a command from the CPU 101, the GPU 104 outputs an image to a display 61 coupled to the management server 100. As the display 61, an arbitrary type of display may be used such as a cathode ray tube (CRT) display, a liquid crystal display (LCD), a plasma display, or an organic electro-luminescence (OEL) display.

The input interface 105 acquires an input signal from an input device 62 coupled to the management server 100, and outputs the input signal to the CPU 101. As the input device 62, a pointing device such as a mouse, a touch panel, a touchpad, or a trackball, a keyboard, a remote controller, a button switch, or the like may be used. A plurality of types of input devices may be coupled to the management server 100.

The medium reader 106 is a reading device that reads a program or data recorded in a recording medium 63. As the recording medium 63, for example, a magnetic disk, an optical disk, a magneto-optical (MO) disk, a semiconductor memory, or the like may be used. The magnetic disk includes a flexible disk (FD) or an HDD. The optical disk includes a compact disc (CD) or a Digital Versatile Disc (DVD).

For example, the medium reader 106 copies the program or the data read from the recording medium 63 into another recording medium such as the RAM 102 or the HDD 103. The read program is executed by, for example, the CPU 101. The recording medium 63 may be a portable-type recording medium, and is used to distribute the program and the data in some cases. The recording medium 63 and the HDD 103 are referred to as computer-readable recording media in some cases.

The NIC 107 is an interface that is coupled to the NW device 300, and communicates with another computer including the node 200 via the NW device 300. For example, the NIC 107 is coupled to the NW device 300 with a cable.

Figure 4:
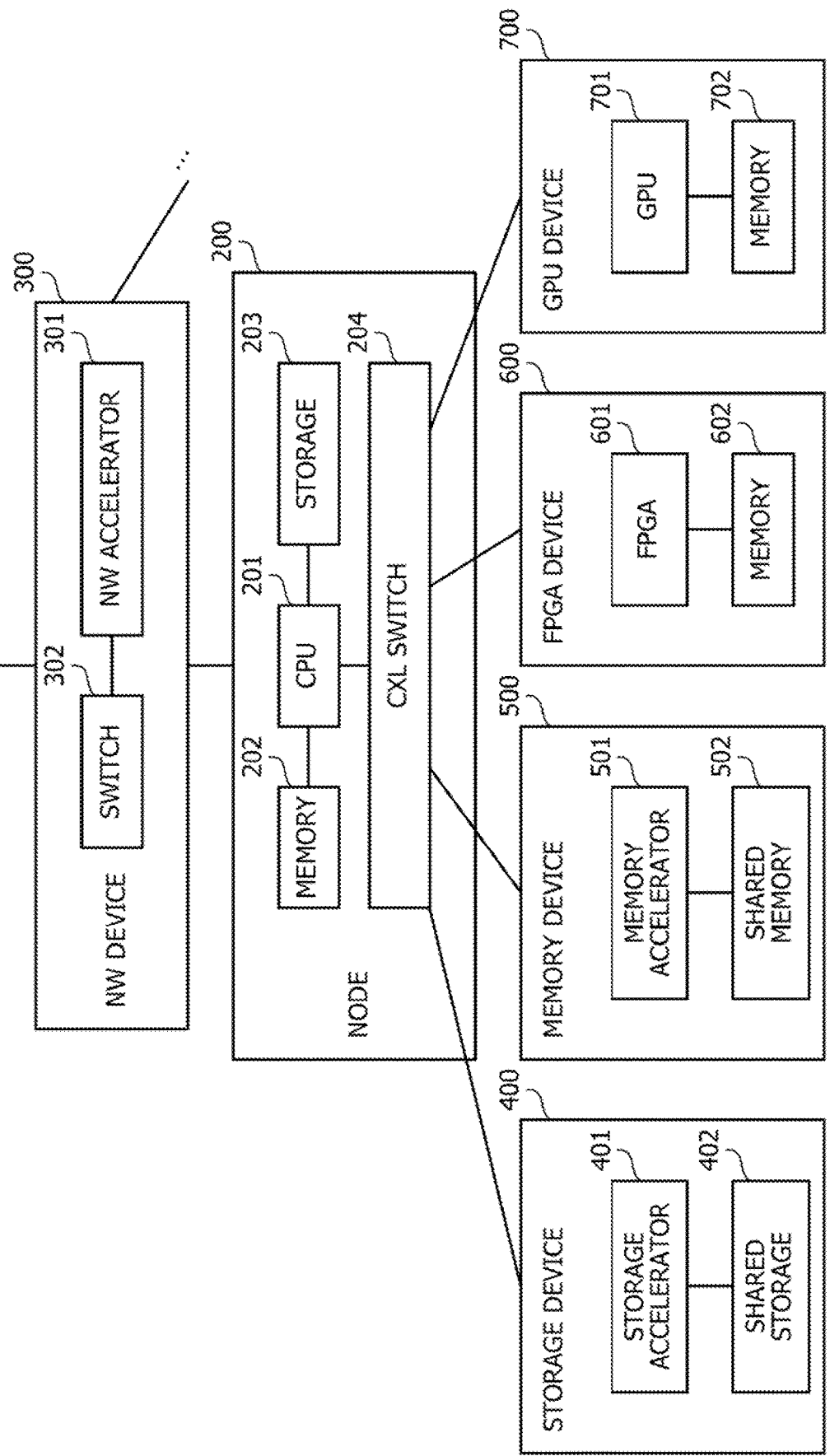
FIG. 4 is a diagram illustrating a hardware example of the information processing system.

FIG. 4 is a diagram illustrating a hardware example of the information processing system.

The node 200 includes a CPU 201, a memory 202, a storage 203, and a CXL switch 204. The CPU 201 is a processor of the node 200. The CPU 201 executes a program stored in the memory 202. The memory 202 is a main storage device of the node 200. The program executed by the CPU 201 is stored in the memory 202. The memory 202 is, for example, a RAM such as a dynamic RAM (DRAM). The same applies to memories described below.

The storage 203 is an auxiliary storage device of the node 200. For example, the storage 203 stores an executable file of an application generated by the management server 100. The CPU 201 loads the executable file stored in the storage 203 into the memory 202, and executes the executable file.

The CXL switch 204 is an interconnect that couples the node 200 to each of the storage device 400, the memory device 500, the FPGA device 600, and the GPU device 700.

The NW device 300 includes an NW accelerator 301 and a switch 302. The NW accelerator 301 is an accelerator usable as an offload destination of a process of the node 200. The NW accelerator 301 is implemented by an FPGA, for example. Based on a protocol of layer 3 or layer 2, the switch 302 determines a transfer destination of received data or transmits the data to the determined transfer destination. For example, the protocol of the layer 3 includes an internet protocol (IP). An example of the layer 2 protocol is Ethernet. Although not illustrated, the NW device 300 includes a memory that holds data to be processed by the NW accelerator 301.

The storage device 400 includes a storage accelerator 401 and a shared storage 402. The storage accelerator 401 is an accelerator usable as an offload destination of the process of the node 200. For example, the storage accelerator 401 is implemented by an FPGA. The shared storage 402 is a storage shared by a plurality of nodes including the node 200. For example, the shared storage 402 is implemented by an HDD, an SSD, or the like. Although not illustrated, the storage device 400 includes a memory that holds data to be processed by the storage accelerator 401.

The memory device 500 includes a memory accelerator 501 and a shared memory 502. The memory accelerator 501 is an accelerator usable as an offload destination of the process of the node 200. The memory accelerator 501 is implemented by an FPGA, for example. The shared memory 502 is a memory shared by the plurality of nodes including the node 200. At least a part of a storage region of the shared memory 502 may be used to hold data to be processed by the memory accelerator 501.

For example, the storage device 400 and the memory device 500 may be coupled to another node (not illustrated) by a CXL interface.

The FPGA device 600 includes an FPGA 601 and a memory 602. The FPGA 601 is an accelerator usable as an offload destination of the process of the node 200. The memory 602 holds data to be processed by the FPGA 601.

The GPU device 700 includes a GPU 701 and a memory 702. The GPU 701 is an accelerator usable as an offload destination of the process of the node 200. The memory 702 holds data to be processed by a GPU 701.

Figure 5:
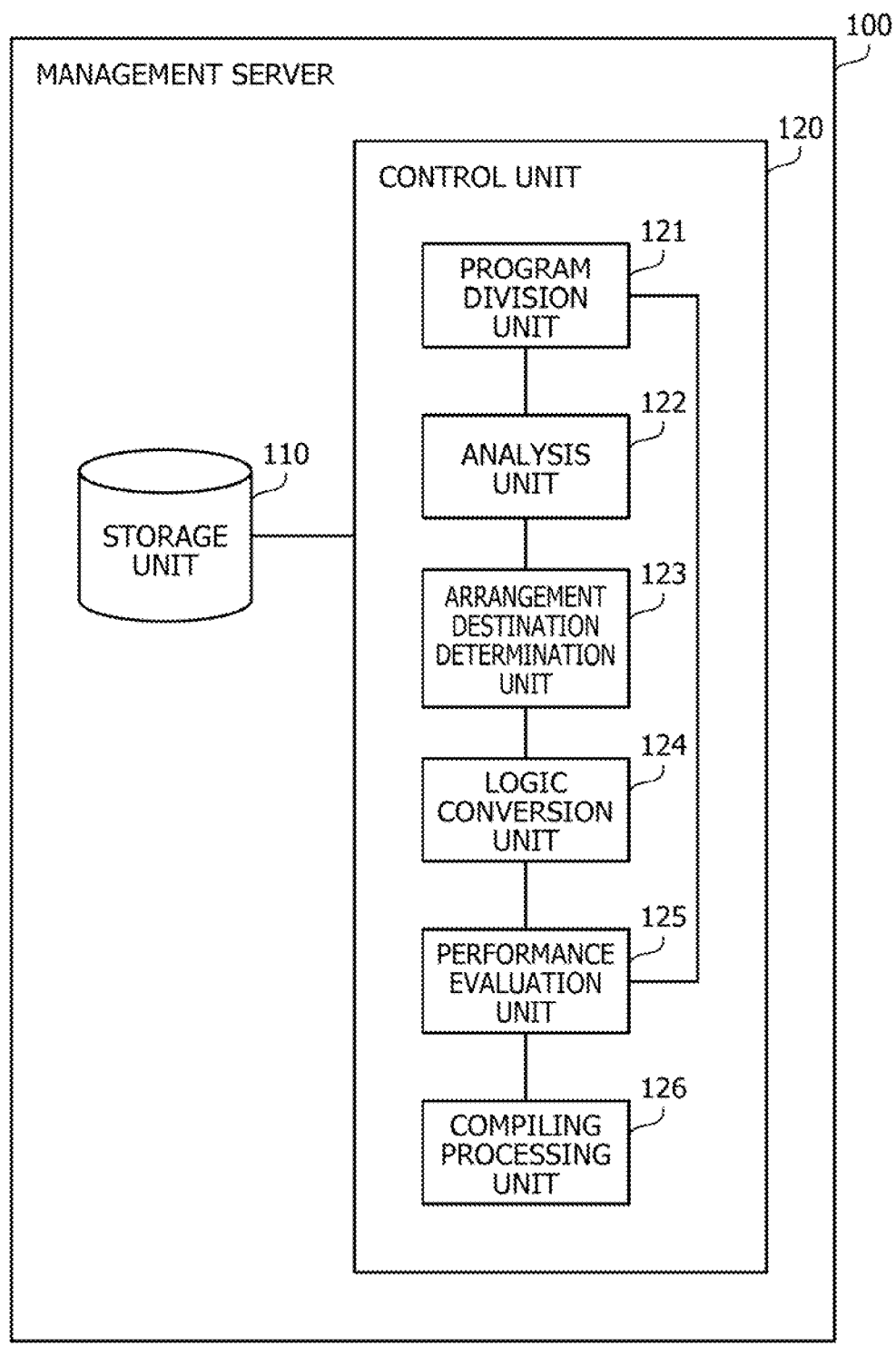
FIG. 5 is a diagram illustrating a function example of the management server.

FIG. 5 is a diagram illustrating a function example of a management server.

The management server 100 includes a storage unit 110 and a control unit 120. A storage region of the RAM 102 or the HDD 103 is used for the storage unit 110. The control unit 120 may be implemented by the CPU 101 executing a program stored in the RAM 102.

The storage unit 110 stores a source code of an application to be executed by the node 200. The storage unit 110 stores an executable file that is a result of compiling the source code by the control unit 120.

The control unit 120 compiles the source code. The control unit 120 generates an executable file so as to offload a part of a process related to the source code to any accelerator coupled to the node 200. The control unit 120 includes a program division unit 121, an analysis unit 122, an arrangement destination determination unit 123, a logic conversion unit 124, a performance evaluation unit 125, and a compiling processing unit 126.

The program division unit 121 divides the source code into a plurality of program blocks. The division between the program blocks is a division between functions. The program block may also be referred to as a task block. One or more functions belong to one program block. A division unit is determined by the number of main functions included in one program block or a capacity (the number of lines) of the code. As the division unit, a plurality of patterns are prepared in advance.

For example, in a case where the division unit is classified by the number of main functions, the following three types are predetermined as grains of the division unit. With a large grain, the number of main functions is approximately equal to or more than 20. With a middle grain, the number of main functions is approximately equal to or more than 5 and equal to or less than 20. With a small grain, the number of main functions is approximately less than 5.

For example, in a case where the division unit is classified based on the capacity of the code, the following three types are predetermined as the grains of the division unit. With a large grain, the number of lines is approximately equal to or more than 1000. With a middle grain, the number of lines is approximately equal to or more than 500 and equal to or less than 1000. With a small grain, the number of lines is approximately less than 500.

The analysis unit 122 analyzes an interaction between program blocks and interaction between the program block and an accelerator. The interaction between the program blocks indicates a time sequence relationship with another program block at a time of execution of each program block or availability of parallel execution with the another program block.

The interaction between the program block and the accelerator indicates an access from the program block to the accelerator. The analysis unit 122 counts an interaction count between the program block and the accelerator. For example, the analysis unit 122 counts the number of times the corresponding accelerator is called (call count) by a predetermined function included in the program block, as the interaction count between the corresponding program block and corresponding the accelerator. For each set of the program block and the accelerator, the analysis unit 122 acquires the interaction count.

In a case where the interaction count between a program block and an accelerator is one or more, it may be said that the program block has an interaction with the accelerator. In a case where the interaction count between a program block and an accelerator is 0, it may be said that the program block does not have an interaction with the accelerator.

Based on the interaction count acquired by the analysis unit 122 for each set of the program block and the accelerator, the arrangement destination determination unit 123 determines an accelerator as an arrangement destination of the corresponding program block. For example, in a case where a certain program block has only an interaction with a single accelerator, the arrangement destination determination unit 123 sets the program block as the arrangement destination of the corresponding accelerator. In a case where a certain program block has interactions with a plurality of accelerators, the arrangement destination determination unit 123 sets the accelerator having the largest interaction count as the arrangement destination of the corresponding program block. In a case where a certain program block has no interaction with any accelerator, the arrangement destination determination unit 123 allocates the corresponding program block to the CPU 201 of the node 200.

The logic conversion unit 124 converts each program block into a hardware logic to be operated in the accelerator of the arrangement destination determined by the arrangement destination determination unit 123. An existing high-level synthesis tool may be used for the logic conversion by the logic conversion unit 124. The existing high-level synthesis tool is, for example, a Vivado HLS compiler, an Intel HLS compiler, or the like.

Based on performance information for each program block obtained from a result of an operation simulation using the hardware logic generated by the logic conversion unit 124, the performance evaluation unit 125 evaluates performance at a time of execution of an application. The performance evaluation unit 125 evaluates the performance at the time of execution of the application, with respect to a result obtained by dividing the source code by a plurality of patterns of division units, and selects a division unit that obtains the most appropriate performance.

The compiling processing unit 126 compiles the source code such that each program block is offloaded to the accelerator of the arrangement destination in a case where the source code is divided by the division unit selected by the performance evaluation unit 125, and generates an executable file.

The control unit 120 tries division with the division unit of the plurality of patterns such as the large grain, the middle grain, and the small grain, selects a division unit having the most appropriate performance index, and compiles the source code.

FIG. 6 is a diagram illustrating an example of the source code.

A source code 111 is stored in the storage unit 110. The source code 111 is a source code of an application to be executed in the node 200, which is described in C language. A line number for convenience is given to each line of the source code 111. In the example of the source code 111, a definition of a structure gmx_many_fft in the first to sixth lines serves as a division of a first main function. A definition of a function gmx_fft_init_many_1d in the next 8-th to 18-th lines is a division of a second main function. A description in the 8-th line in the division of the second main function corresponds to a call of the fft function.

Figure 7:
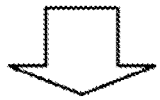
FIG. 7 is a diagram illustrating a description example of a loop.

FIG. 7 is a diagram illustrating a description example of a loop.

A code 111c indicates a description example of a loop that may be included in the source code 111. The code 111c is a description example of a matrix product c of matrices a and b. a, b, and c are square matrices having n rows and n columns. The code 111c includes a loop description repeatedly executed by a for statement. Calculation related to such a loop description is appropriately handled by an accelerator such as an FPGA, for example, and may be efficiently processed by being offloaded to the accelerator.

Figure 8:
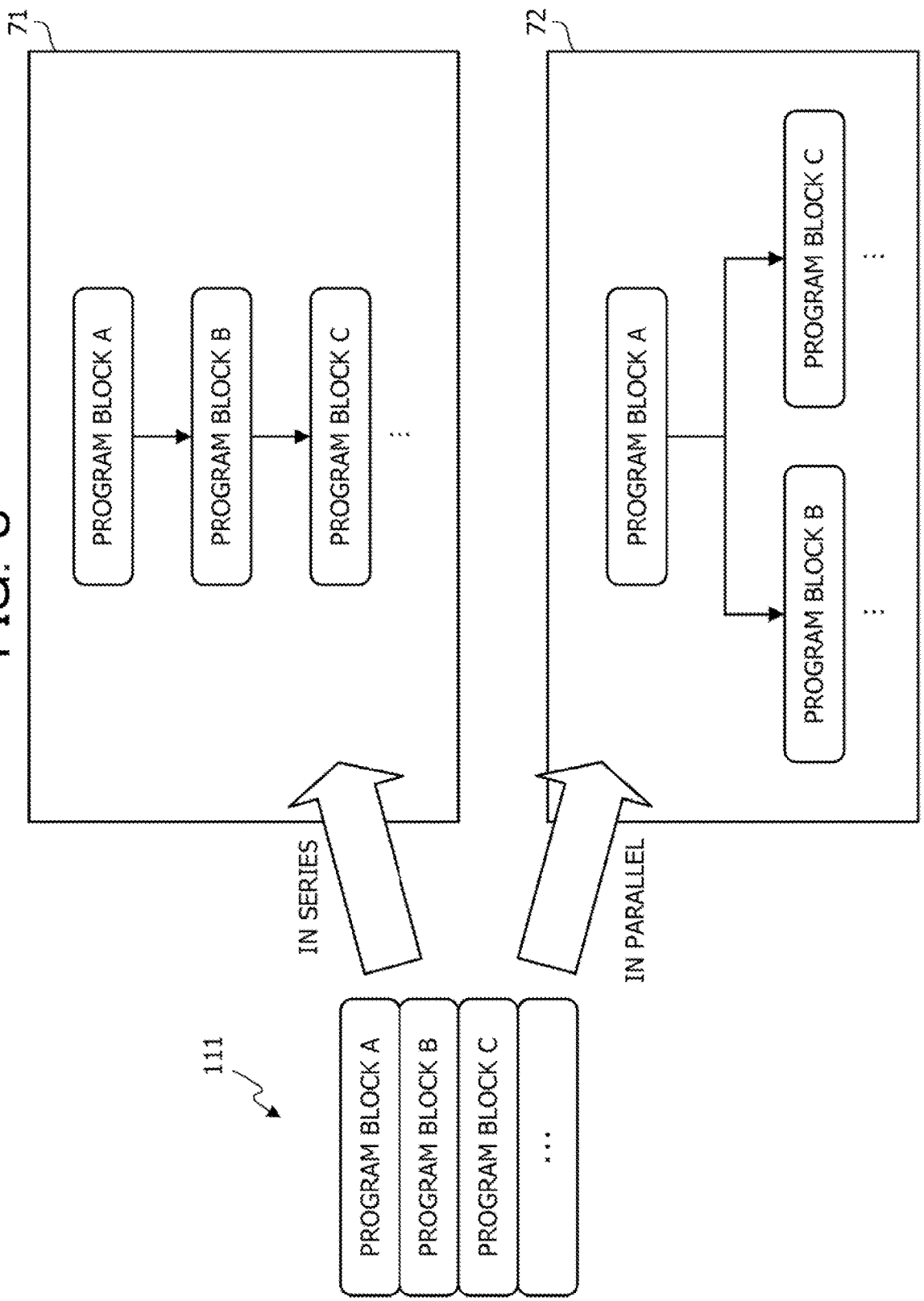
FIG. 8 is a diagram illustrating an example of an interaction between program blocks.

FIG. 8 is a diagram illustrating an example of an interaction between program blocks.

The program division unit 121 divides the source code 111 into a plurality of program blocks. The plurality of program blocks include program blocks A, B, C, . . . . As an interaction between the program blocks, the analysis unit 122 acquires an order relationship among the program blocks A, B, C, . . . . For example, the analysis unit 122 may obtain the order relationship by analyzing a dependency relationship or the like of variables included in each program block by using an existing technology.

For example, a sequence 71 indicates a case where the program blocks A, B, and C are executed in series in this order such that the program block A is followed by the program block B, which is followed by the program block C. A sequence 72 indicates a case where the program blocks B and C are executable in parallel next to the program block A. An analysis result of the interaction between the program blocks is used to evaluate a time (calculation time) desirable for executing calculation corresponding to the source code 111.

FIG. 9 is a diagram illustrating an example of an interaction count table.

An interaction count table 112 is a table that holds an analysis result of an interaction count between a program block and an accelerator. The interaction count table 112 is generated by the analysis unit 122, and stored in the storage unit 110. The interaction count table 112 includes items of a program block identifier (ID), a storage interaction count, an NW interaction count, a memory interaction count, an FPGA interaction count, and a GPU interaction count.

The program block ID is registered in the item of the program block ID. The program block ID is identification information of the program block.

The storage interaction count is registered in the item of the storage interaction count. The storage interaction count corresponds to the call count from the node 200 to the storage device 400, based on the corresponding program block.

The NW interaction count is registered in the item of the NW interaction count. The NW interaction count corresponds to the call count from the node 200 to the NW device 300, based on the corresponding program block.

The memory interaction count is registered in the item of the memory interaction count. The memory interaction count corresponds to the call count from the node 200 to the memory device 500, based on the corresponding program block.

The FPGA interaction count is registered in the item of the FPGA interaction count. The FPGA interaction count corresponds to the call count from the node 200 to the FPGA device 600, based on the corresponding program block.

The GPU interaction count is registered in the item of the GPU interaction count. The GPU interaction count corresponds to the call count from the node 200 to the GPU device 700, based on the corresponding program block.

An interaction count for a certain device indicates the number of accesses from the corresponding program block to an accelerator mounted in the device. For example, the analysis unit 122 obtains the interaction count with the device, by counting the number of calls of a predetermined function corresponding to the device (call count), included in the corresponding program block.

With the C language as an example, a predetermined function corresponding to a type of device, for example, a predetermined function corresponding to an accelerator mounted on the device includes the following. In the shared storage (storage device 400), for example, a function for writing to a file, such as an ftputc function, an ftputs function, and an ftprintf function is called. In the shared memory (memory device 500), for example, an mmap function and the like are called. In the NW device 300, for example, an ioctl function, a socket function, a connect function, and the like are called. In the GPU device 700, for example, cuda and the like are called. In the FPGA device 600, for example, an fftw function that is a function of Fourier transform, a gmx_fft library function of GROMACS, and the like are called. A calculation function appropriately handled by an FPGA includes a matrix product, a multiplication, a product-sum operation, a barrel shifter, a complex number operation, a trigonometric function operation, and the like illustrated in FIG. 7. The calculation function appropriately handled by the FPGA differs depending on an environment and an application, and thus the calculation function is not limited to these and may be another function.

For example, the interaction count table 112 has a record of a program block ID "A", a storage interaction count "4", an NW interaction count "0", a memory interaction count "0", an FPGA interaction count "0", and a GPU interaction count "0". This record indicates that the storage interaction count of the program block A is 4, the NW interaction count is 0, the memory interaction count is 0, the FPGA interaction count is 0, and the GPU interaction count is 0. The interaction count table 112 also has records of other program blocks including the program blocks B and C.

Next, a processing procedure by the management server 100 will be described.

Figure 10:
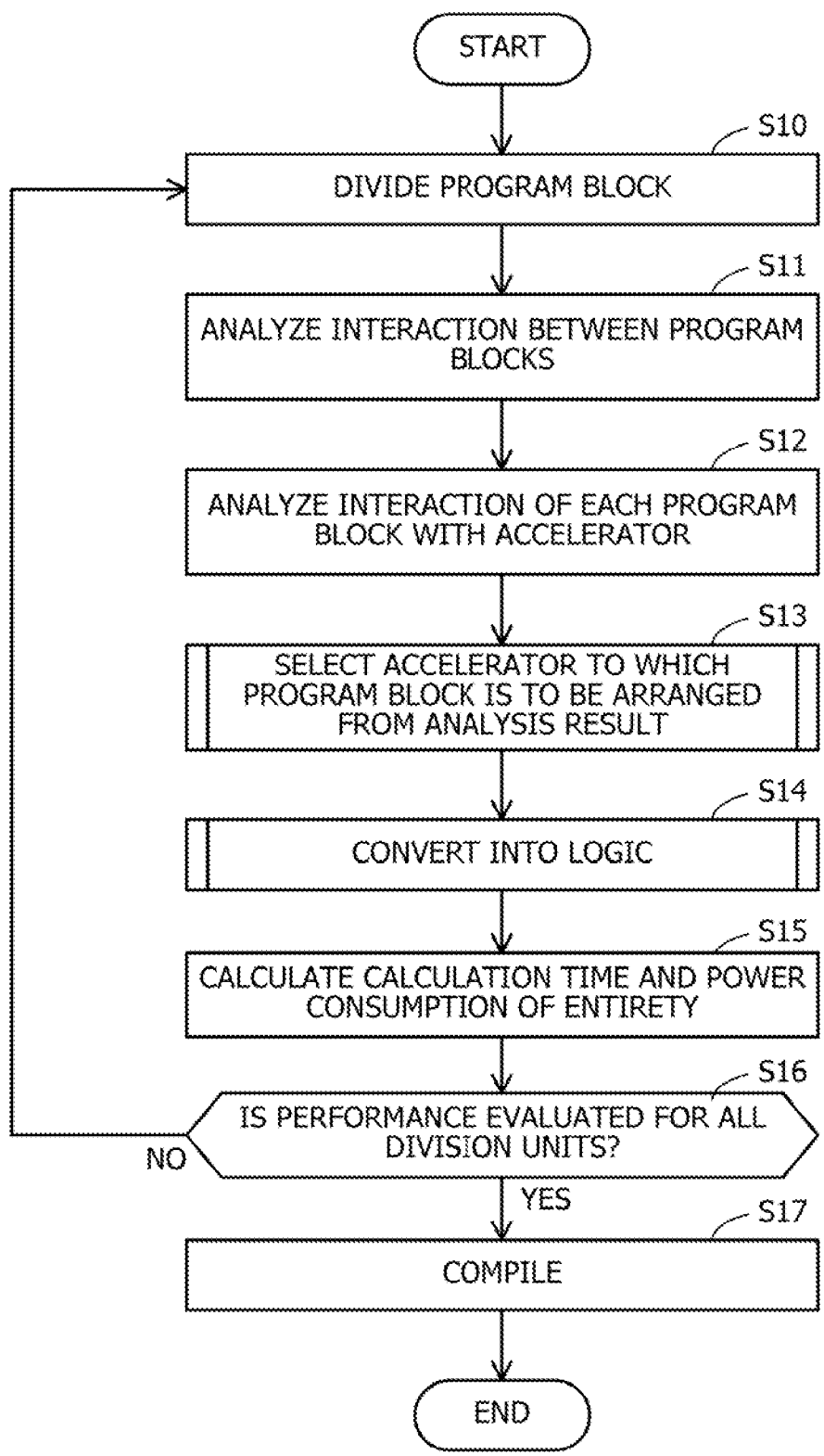
FIG. 10 is a flowchart illustrating a process example of the management server.

FIG. 10 is a flowchart illustrating a process example of the management server.

(S10) The program division unit 121 divides the source code 111 into a plurality of program blocks, with a predetermined division unit. For example, the plurality of program blocks include the program blocks A, B, C, . . . . Every time step S10 is executed, the program division unit 121 changes the division unit to a large grain, a middle grain, and a small grain. As described above, each grain of the division units is predetermined based on the number of main functions included in one program block, the number of lines of code, or the like.

(S11) The analysis unit 122 analyzes an interaction between the program blocks obtained in step S10. For example, as illustrated in FIG. 8, the analysis unit 122 analyzes a time sequence relationship or a parallel execution possibility of each program block.

(S12) The analysis unit 122 analyzes an interaction of each program block with an accelerator. For example, the analysis unit 122 acquires the number of calls of a predetermined function corresponding to a device, in which the accelerator is mounted, as an interaction count, based on a description of the program block, and records the number of calls in the interaction count table 112.

(S13) The arrangement destination determination unit 123 determines an accelerator to which the program block is to be arranged, based on the interaction count table 112, which is a result of analyzing by the analysis unit 122. Details of the process by the arrangement destination determination unit 123 will be described below.

(S14) The logic conversion unit 124 performs logic conversion. For example, the logic conversion unit 124 uses an existing high-level synthesis tool to convert the program block into a logic to be operated in the accelerator of an arrangement destination. Details of the process of the logic conversion unit 124 will be described below. The logic conversion unit 124 performs an operation simulation of the logic after the conversion, and acquires a calculation time or power consumption desirable for an arithmetic operation corresponding to each program block.

(S15) Based on the calculation time and the power consumption obtained in step S14, the performance evaluation unit 125 calculates a calculation time and power consumption for executing the entire application corresponding to the source code 111. For example, the performance evaluation unit 125 may calculate the calculation time of the entire application based on an analysis result of the interaction between the program blocks analyzed in step S11 and the calculation time of each program block in each accelerator. For example, the performance evaluation unit 125 adds up the calculation times corresponding to each program block at locations in the source code 111, at which each program block is executed in series. For a location in the source code 111 at which two or more program blocks are executable in parallel, the performance evaluation unit 125 sets the longest calculation time among the two or more program blocks. The performance evaluation unit 125 calculates overall power consumption by summing up power consumption of each accelerator and power consumption of the CPU 201. For a part of the source code 111 allocated to the CPU 201, the performance evaluation unit 125 may evaluate a calculation time and power consumption by using an existing technology such as a static analysis, a simulation, or a machine learning model for the part.

(S16) The performance evaluation unit 125 determines whether or not performance is evaluated for all the division units prepared in advance. In a case where the performance is evaluated for all the division units, the process proceeds to step S17. In a case where the performance evaluation is not performed for all the division units, the process proceeds to step S10. At step S10, the program division unit 121 divides the source code 111 by the unprocessed division unit, and the following procedure is executed.

(S17) The compiling processing unit 126 compiles the source code 111 by adopting the accelerator arrangement of each program block in the division unit with which the result of the performance evaluation by the performance evaluation unit 125 is the most appropriate. Based on the source code 111, the compiling processing unit 126 generates an executable file. The executable file includes an executable program that causes the CPU 201 to execute an operation in cooperation with each accelerator and hardware logic information for setting each accelerator. The hardware logic information is, for example, information used for setting a circuit of the corresponding accelerator. For example, the hardware logic information may be a register transfer level (RTL) description of an FPGA or the like. The hardware logic information may be information indicating a logic specific to specific hardware such as a GPU. The process by the management server 100 is ended.

Based on a selection criterion for the division unit with the most appropriate result of the performance evaluation in step S17, for example, a division unit with the minimum calculation time and power consumption is preferentially selected. For example, in a case where there is no division unit with which both the calculation time and the power consumption are the minimum, a division unit with which the calculation time or the power consumption having a priority is the minimum is preferentially selected. Meanwhile, the selection criterion is an example, and another selection criterion may be used.

For example, the management server 100 causes the CPU 201 of the node 200 to execute the generated executable file. With the hardware logic information included in the executable file, the CPU 201 performs configuration on the corresponding accelerator, and executes a process of the application in cooperation with the accelerator.

Figure 11:
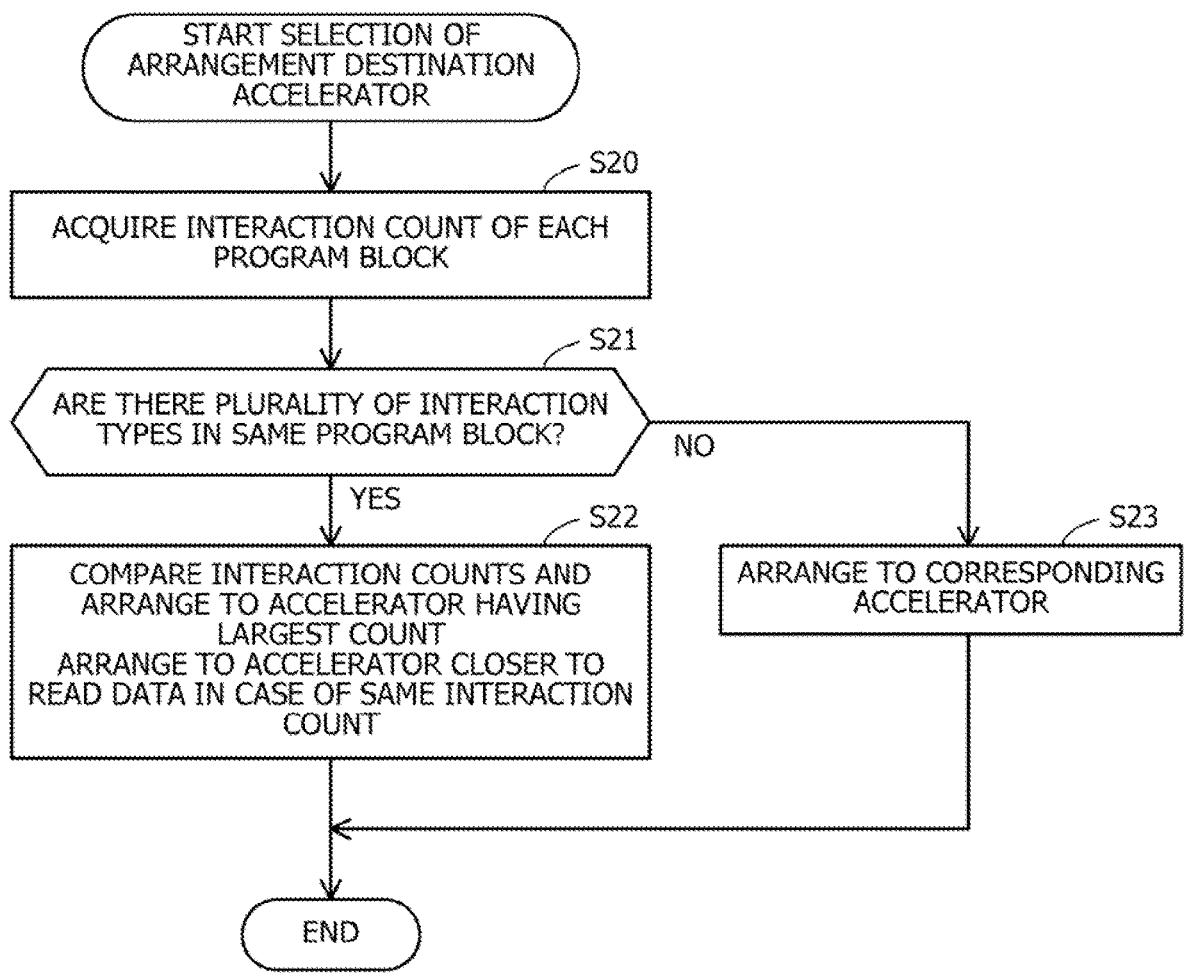
FIG. 11 is a flowchart illustrating a selection example of an arrangement destination accelerator.

FIG. 11 is a flowchart illustrating a selection example of an arrangement destination accelerator.

The selection of the arrangement destination accelerator corresponds to step S13.

(S20) The arrangement destination determination unit 123 acquires an interaction count in each program block, based on the interaction count table 112. The arrangement destination determination unit 123 extracts a program block with which the interaction count recorded in the interaction count table 112 is not all 0, and executes step S21 and the following procedure, which will be described below, for each program block.

(S21) The arrangement destination determination unit 123 determines whether or not there are a plurality of interaction types in the same program block. In a case where there are a plurality of interaction types in the same program block, the process proceeds to step S22. In a case where there are no plurality of interaction types in the same program block, the process proceeds to step S23. The case where there are the plurality of interaction types corresponds to a case where there are a plurality of items in which the interaction count is one or more, for the corresponding program block, in the interaction count table 112. The case where there are no plurality of interaction types corresponds to a case where there is only one item having an interaction count equal to or more than one, for the corresponding program block, in the interaction count table 112.

(S22) The arrangement destination determination unit 123 compares the interaction counts, and determines that the corresponding program block is to be arranged in an accelerator having the largest interaction count. In a case of the same interaction count, for example, in a case where there are a plurality of accelerators having the largest interaction count, the arrangement destination determination unit 123 determines that the corresponding program block is to be arranged in an accelerator closer to read data. For example, in a case where the NW interaction count and the memory interaction count are the largest and the same, the arrangement destination determination unit 123 preferentially selects the memory accelerator 501 close to the data as the arrangement destination. The arrangement destination determination unit 123 ends the process on the corresponding program block.

(S23) The arrangement destination determination unit 123 determines that the program block is to be arranged in the corresponding accelerator having the interaction count of one or more. The arrangement destination determination unit 123 ends the process on the corresponding program block.

The arrangement destination determination unit 123 allocates a program block with which the interaction count recorded in the interaction count table 112 is all 0 to the CPU 201 of the node 200.

Figure 12:
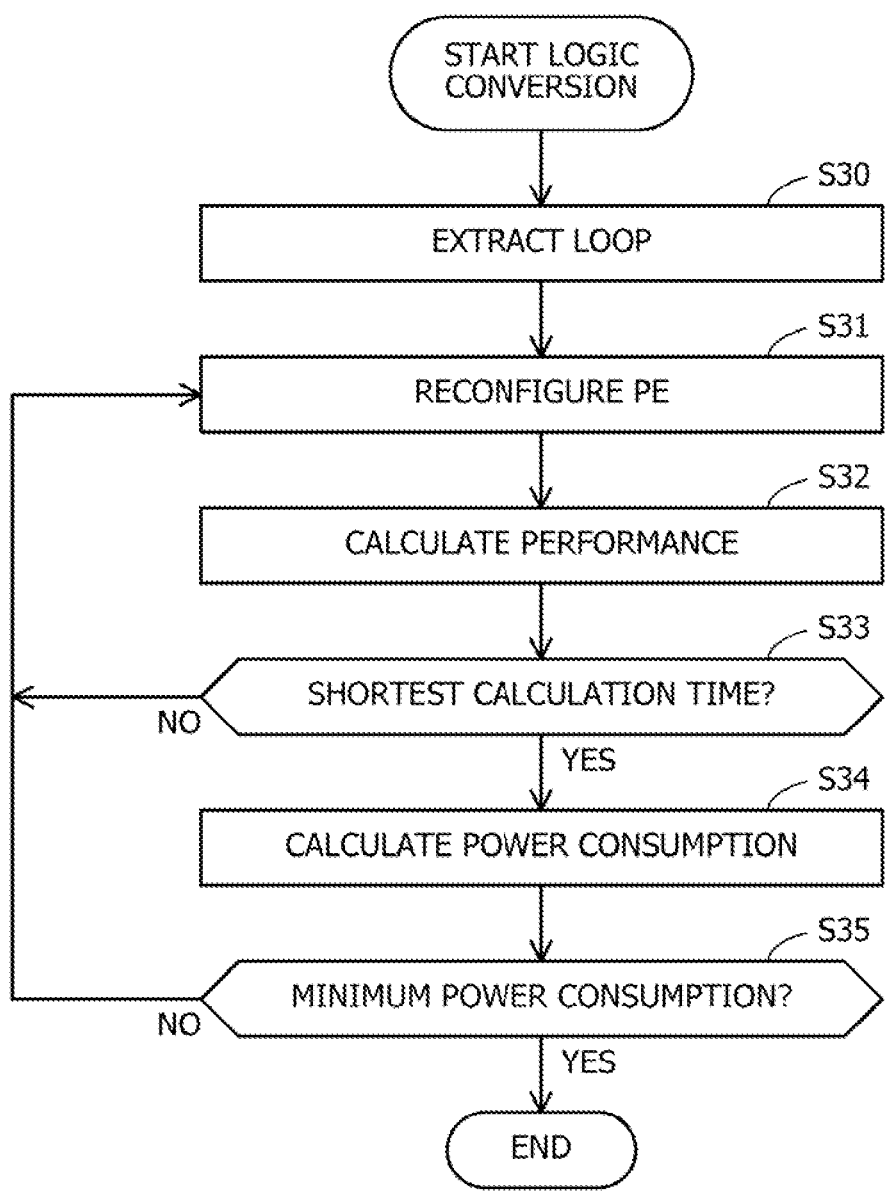
FIG. 12 is a flowchart illustrating an example of logic conversion.

FIG. 12 is a flowchart illustrating an example of logic conversion.

The logic conversion corresponds to step S14. The logic conversion is performed for each accelerator.

(S30) The logic conversion unit 124 extracts a loop for the program block having the corresponding accelerator as the arrangement destination.

(S31) The logic conversion unit 124 performs reconfiguration on a processing element (PE) in the accelerator to convert the corresponding program block into a hardware logic to be operated in the accelerator. For example, a description of the loop or the like extracted in step S30 is converted into a hardware logic. The logic conversion unit 124 generates hardware logic information indicating the hardware logic.

For example, the logic conversion unit 124 may convert the description of the program block into the hardware logic by using an existing high-level synthesis tool.

(S32) The logic conversion unit 124 simulates an operation of the accelerator based on the hardware logic information generated in step S31, and calculates performance. At step S32, the logic conversion unit 124 obtains, as the performance, for example, a calculation time for each hardware logic corresponding to the program block.

(S33) The logic conversion unit 124 determines whether or not the calculation time is the minimum. In a case where the calculation time is the minimum, the process proceeds to step S34. In a case where the calculation time is not the minimum, the process proceeds to step S31, and reconfiguration is performed on the PE again. The calculation time in step S33 is a total calculation time in the corresponding accelerator. Since there is no calculation time to be compared in a case where step S33 is executed for a certain accelerator for the first time, the logic conversion unit 124 advances the process to step S33 without the determination in step S34.

(S34) The logic conversion unit 124 calculates power consumption in the corresponding accelerator. For example, the logic conversion unit 124 may calculate the power consumption, based on a catalog value of power consumption of the accelerator and a total calculation time in the accelerator. The logic conversion unit 124 may calculate the power consumption, by using a machine learning model that outputs power consumption in response to an input of the hardware logic information. For example, an initial value of the power consumption may be calculated based on the catalog value of power consumption, or data of the power consumption may be accumulated while being corrected and learned by an operation log.

(S35) The logic conversion unit 124 determines whether or not the power consumption is minimum. In a case where the power consumption is the minimum, the logic conversion for the corresponding accelerator is ended. In a case where the power consumption is not the minimum, the process proceeds to step S31, and reconfiguration is performed on the PE again. Since there is no power consumption to be compared in a case where step S35 is executed for a certain accelerator for the first time, the logic conversion unit 124 advances the process to step S35 without the determination in step S31.

Even in a case where the procedure in steps S31 to S35 is repeated a predetermined number of times, a final hardware logic conversion result may not be obtained in some cases. In this case, for example, the logic conversion unit 124 may set, as the final conversion result, a conversion result in which a priority is given to the calculation time and the power consumption among the conversion results in which both the calculation time and the power consumption are more appropriate than target values.

The processing procedure by the management server 100 is described above.

A technology for converting a program describing an application into a logic of an accelerator is referred to as high-level synthesis (CGRA). For example, the number of iterations of a function (loop extraction), optimization of microarchitectural wiring, or the like is studied in the CGRA. In the reconfiguration of the CGRA, generally, by reducing a grain (division unit) of a function unit or the like, arrangement is performed in consideration of the repetition of the function and the microarchitecture. Therefore, for example, a repeated processing portion of the process performed only by the CPU is arranged in the accelerator, and improvement in calculation speed or improvement in energy efficiency is attempted by microarchitectural efficiency. For example, in Just in Time high-level synthesis in which reconfiguration of the CGRA is performed during compiling, performance is improved by shortening the compiling time and mapping a loop.

Meanwhile, in a heterogeneous environment, an accelerator of a CGRA target is arranged at various positions. For example, an accelerator such as an FPGA or a GPU is arranged not only in a chip of the node 200 but also at various positions such as in the vicinity of an external storage via an interconnect and in the vicinity of a network. For this reason, there is a problem that it is difficult to perform overall optimization even in a case where it is possible to locally optimize a specific accelerator only with the existing high-level synthesis technology.

As described above, in a case where the reconfiguration grain is fine, although ease of compiling or local optimization is achieved, in some cases, overall optimization is not performed. This is because the locations of the accelerators (targets of the CGRA) are dispersed such as in the vicinity of the core, in the vicinity of the memory, in the vicinity of the network, and in the vicinity of the storage, and each interaction affects.

Accordingly, in consideration of the interaction with each accelerator in the program block, the management server 100 preferentially synthesizes the accelerators having many interactions, so that not only the local optimization but also the overall optimization may be achieved. For example, optimized CGRA conversion may be performed in the entire system including a plurality of accelerators.

For example, the management server 100 preferentially arranges each program block of the source code 111 in an accelerator having a large access count among the program blocks. For this reason, data transfer between the CPU 201 and the accelerator during the execution of the process related to the program block is reduced. As a result, an overhead related to the data transfer is reduced. Accordingly, the management server 100 may improve processing performance at the time of application execution by cooperation of the node 200 and the accelerator.

By selecting an optimum division unit in consideration of calculation time and power consumption, the management server 100 may execute a program at an optimum execution speed while reducing the power consumption in the entire system.

As described above, the management server 100 executes the following process.

The control unit 120 divides a source program into a plurality of program blocks. The control unit 120 acquires a result of analysis of an access count from each of the plurality of program blocks to each of a plurality of accelerators. Based on the result of the analysis, the control unit 120 selects a first program block among the plurality of program blocks, and an accelerator as an arrangement destination of the first program block among the plurality of accelerators. The control unit 120 converts the first program block into a hardware logic to be operated in the accelerator of the arrangement destination.

Therefore, the management server 100 may allocate a process to an appropriate accelerator. For example, data transfer between the CPU 201 and the accelerator in a case where the process related to the program block arranged in the accelerator is executed is reduced. As a result, an overhead related to the data transfer is reduced. Accordingly, the management server 100 may improve processing performance at the time of application execution by cooperation of the node 200 and the accelerator. The source code 111 is an example of the source program. A storage interaction count, an NW interaction count, a memory interaction count, an FPGA interaction count, and a GPU interaction count are examples of the access count to each of the plurality of accelerators.

In the selection of the arrangement destination accelerator, the control unit 120 may select an accelerator having the largest access count by the first program block among the plurality of accelerators as the arrangement destination accelerator. Therefore, the management server 100 may efficiently reduce data transfer between the CPU 201 and the accelerator in a case where the process related to the program block arranged in the accelerator is executed.

The plurality of accelerators may include a first accelerator provided in the memory device 500. In the selection of the arrangement destination accelerator, in a case where two or more accelerators having the same access count by the first program block include the first accelerator, the control unit 120 may preferentially select the first accelerator as the arrangement destination accelerator. Therefore, the management server 100 may efficiently reduce data transfer between the CPU 201 and the accelerator in a case where the process related to the program block arranged in the accelerator is executed. The memory accelerator 501 is an example of the first accelerator.

The control unit 120 may analyze the access count from each of the plurality of program blocks to each of the plurality of accelerators. In the analysis, the control unit 120 may acquire the access count, based on the number of calls of a function corresponding to each of the plurality of accelerators, which is included in the plurality of program blocks. Therefore, the management server 100 may efficiently acquire the access count from each of the plurality of program blocks to each of the plurality of accelerators.

The function corresponding to each of the plurality of accelerators may be a function according to a device in which the accelerator is mounted or a type of the device. The NW device 300, the storage device 400, the memory device 500, the FPGA device 600, and the GPU device 700 are examples of the device on which the accelerator is mounted. For example, each of the plurality of accelerators may be mounted in any one of the NW device 300, the storage device 400, the memory device 500, the FPGA device 600, and the GPU device 700.

In the selection of the first program block, the control unit 120 may select, as the first program block, a program block with which an access count to at least one accelerator among the plurality of accelerators is one or more. Therefore, the management server 100 may appropriately specify a program block to be allocated to any of the accelerators.

The control unit 120 may select a plurality of first program blocks, in the selection of the first program block. In the selection of the arrangement destination accelerator, the control unit 120 may select an accelerator as the arrangement destination, for each first program block. Therefore, the management server 100 may allocate a process to an appropriate accelerator.

The control unit 120 may divide the source program into the plurality of program blocks by using each of a plurality of division units. In a system including the plurality of accelerators, the control unit 120 may acquire, for each division unit, an index value indicating performance of the system in a case where a process of at least some of the plurality of program blocks is executed by at least some of the plurality of accelerators. Based on the index value for each division unit, the control unit 120 may select any division unit among the plurality of division units.

For example, the control unit 120 may acquire the index value indicating the performance of the system for each of the plurality of division units indicating a grain of division of the plurality of program blocks, based on a result of analysis of an execution order of the plurality of program blocks and the hardware logic. Based on the index value acquired for each division unit, the control unit 120 may select any division unit among the plurality of division units.

Therefore, the management server 100 may execute the program while further improving the performance of the entire system. The information processing system 20 or the information processing system according to the second embodiment is an example of the system described above. The result of the analysis of the execution order of the plurality of program blocks may include information such as a time sequence relationship at a time of execution between the program blocks and a parallel execution possibility of two or more program blocks.

In the acquisition of the index value indicating the performance of the system, the control unit 120 may acquire a calculation time and power consumption desirable to execute an arithmetic operation corresponding to the source program. Therefore, the management server 100 may allocate a process to an appropriate accelerator while increasing an execution speed of an arithmetic operation and reducing the power consumption in the entire system.

Based on the hardware logic obtained by converting the program block, the control unit 120 may generate an executable file for causing the system including the plurality of accelerators to execute the arithmetic operation corresponding to the source program. Therefore, by causing the system to execute the executable file, the management server 100 may cause the system to efficiently execute an arithmetic operation by using the accelerator.

The information processing according to the first embodiment may be implemented by causing the processing unit 12 to execute a program. The information processing according to the second embodiment may be implemented by causing the CPU 101 to execute a program. The program may be recorded in the computer-readable recording medium 63.

For example, the program may be circulated by distributing the recording medium 63 in which the program is recorded. The program may be stored in another computer, and the program may be distributed via a network. For example, a computer may store (install), in a storage device such as the RAM 102 or the HDD 103, the program recorded in the recording medium 63 or the program received from the another computer, and may read the program from the storage device to execute the program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a conversion program for causing a computer to execute a process comprising:
    dividing a source program into a plurality of program blocks;
    selecting, based on a result of analysis of an access count from each of the plurality of program blocks to each of a plurality of accelerators, a first program block among the plurality of program blocks and an accelerator of an arrangement destination of the first program block, among the plurality of accelerators;
    converting the first program block into a hardware logic to be operated in the accelerator of the arrangement destination;
    counting a number of times of calls of a function that corresponds to each of the plurality of accelerators, which is included in the plurality of program blocks; and
    acquiring the number of calls of the function as the access count, in the analysis.

2. The non-transitory computer-readable recording medium according to claim 1, wherein the conversion program causes the computer to execute a process of selecting, in the selecting of the accelerator of the arrangement destination, an accelerator with a largest access count by the first program block, among the plurality of accelerators, as the accelerator of the arrangement destination.

3. The non-transitory computer-readable recording medium according to claim 1, wherein the plurality of accelerators include a first accelerator provided in a memory device, and the conversion program causes the computer to execute a process of preferentially selecting, in the selecting of the accelerator of the arrangement destination, in a case where two or more accelerators with the same access count by the first program block include the first accelerator, the first accelerator as the accelerator of the arrangement destination.

4. The non-transitory computer-readable recording medium according to claim 1, wherein the conversion program causes the computer to execute a process of selecting, in the selecting of the first program block, a program block with which the access count to at least one accelerator among the plurality of accelerators is one or more, as the first program block.

5. The non-transitory computer-readable recording medium according to claim 1, wherein the conversion program causes the computer to execute a process of selecting, in the selecting of the first program block, a plurality of the first program blocks, and selecting, in the selecting of the accelerator of the arrangement destination, the accelerator of the arrangement destination, for each of the first program blocks.

6. The non-transitory computer-readable recording medium according to claim 1, wherein the conversion program causes the computer to execute a process of acquiring an index value that indicates performance of a system that includes the plurality of accelerators in a case where a process of at least a part of the plurality of program blocks is executed by at least a part of the plurality of accelerators in the system, for each of a plurality of division units that indicate a grain of division of the plurality of program blocks, based on a result of analysis of an execution order of the plurality of program blocks and the hardware logic, and selecting any one division unit of the plurality of division units, based on the index value acquired for each of the division units.

7. The non-transitory computer-readable recording medium according to claim 6, wherein the conversion program causes the computer to execute a process of acquiring, in the acquiring of the index value, a calculation time and power consumption desirable to execute an arithmetic operation that corresponds to the source program.

8. The non-transitory computer-readable recording medium according to claim 1, wherein the conversion program causes the computer to execute a process of generating, based on the hardware logic, an executable file that causes a system which includes the plurality of accelerators to execute an arithmetic operation which corresponds to the source program.

9. A conversion processing method comprising:
    dividing a source program into a plurality of program blocks;
    selecting, based on a result of analysis of an access count from each of the plurality of program blocks to each of a plurality of accelerators, a first program block among the plurality of program blocks and an accelerator of an arrangement destination of the first program block, among the plurality of accelerators;
    converting the first program block into a hardware logic to be operated in the accelerator of the arrangement destination;
    counting, in the analysis, a number of times of calls of a function that corresponds to each of the plurality of accelerators, which is included in the plurality of program blocks; and
    acquiring the number of calls of the function as the access count.

* * * * *